United States Patent Office 3,317,607
Patented May 2, 1967

3,317,607
CHEMICAL REDUCTION OF NITROSAMINES
Harold K. Latourette, Pennington, N.J., and John A. Pianfetti, Charleston, W. Va., assignors to FMC Corporation, a corporation of Delaware
No Drawing. Filed July 30, 1959, Ser. No. 830,465
6 Claims. (Cl. 260—583)

This invention relates to the reduction of nitrosamines. More particularly, it relates to the reduction of certain disubstituted N-nitrosamines by treatment with a metal and an acid to form the corresponding disubstituted hydrazines.

This application is a continuation-in-part of application Ser. No. 507,484, filed May 10, 1955, now abandoned.

The nitrosamines of this invention are the di-lower alkyl nitrosamines of the formula R'R"N—NO where R' and R" are saturated or unsaturated aliphatic radicals containing 1 to 8 carbon atoms and certain heterocyclic N-nitrosamines such as pyrrolidine, piperidine, and morpholine.

Unsaturated nitrosamines, such as N-nitrosodiallyamine, may be reduced to the corresponding hydrazine by the process of this invention without saturation of the double bond.

The disubstituted hydrazines prepared by this process are useful as rocket fuels, gas absorbents, anti-oxidants, anti-skinning agents in paints, solvents, intermediates in the production of other chemicals, and for other purposes.

The most widely known method of preparation of the disubstituted hydrazines is the chemical reduction of the corresponding nitrosamine with zinc and acetic acid in dilute solution. Hatt, for example, in "Organic Syntheses," Collective Volume II, page 212, has described the preparation of N,N-dimethylhydrazines from dimethylnitrosamine, using these reagents and 1 liter of water for 0.9 mole of the nitrosamine, equivalent to about 60 moles of water per mole of nitrosamine. Although this method is satisfactory for the preparation of laboratory quantities of the products, the relatively high cost of acetic acid and the dilute solution from which the substituted hydrazine must be recovered make this process uneconomical for commercial production. Sixty pounds of this acid are required to provide 1 pound of nascent hydrogen, which is the actual reducing agent. The high ratio of total weight of acid to active hydrogen content enhances the significance of the cost of the acid. The concentration of the product in the reaction mixture is important, since the preferred recovery procedure involves the addition of caustic soda in proportion to the amount of water present.

It is an object of this invention to provide a simple and economical procedure for effecting the reduction of nitrosamines to the corresponding hydrazines.

We have discovered that the N-nitroso derivatives of di-lower alkyl amines and certain heterocyclic amines may be converted to the corresponding hydrazines in good yield by forming an aqueous mixture of the nitroso compound and zinc and adding sulfuric or hydrochloric acid at a controlled rate until the acid concentration in the reaction mixture corresponds to a pH of 2 to 4, the total amount of water in the final reaction mixture corresponding to about 8 to about 30 moles per mole of nitroso compound charged to the system.

This finding was entirely unexpected, since the prior art recommends only acetic as the acid to be used with zinc in reducing dialkyl nitrosamines and does not indicate that high yields can be obtained with water in such limited amounts as the reaction medium. Moreover, the prior art indicates that nitrosamines, when heated with strong acids, are converted back to the amines from which they were formed.

The reactions may be represented by the following equation:

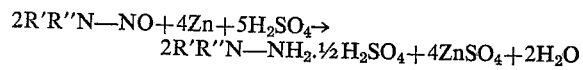

2R'R"N—NO+4Zn+5H$_2$SO$_4$→
    2R'R"N—NH$_2$·½H$_2$SO$_4$+4ZnSO$_4$+2H$_2$O

The nitrosamines used in the process of this invention may be prepared by any known method, such as the nitrosation of secondary amines with sodium nitrite and an acid or with nitrogen trioxide. Crude nitrosamine solution containing 0.5 to 10 or more moles of water per mole of nitrosamine, and also containing sodium sulfate or other salt if prepared by the use of nitrite and an acid, is satisfactory.

Zinc is the preferred metal for the reduction because of its low cost and the high yields obtained when using it. Certain other metals, such as aluminum, iron, and magnesium, may also be used. The metal is normally used in a slight excess over the theoretical amount required.

Any of the common non-oxidizing mineral acids, such as sulfuric, hydrochloric, and phosphoric, may be used in the process. Excellent yields are obtained with sulfuric and hydrochloric acids and these acids are also the most economical for use in the process.

It is necessary that sufficient water be present in the reaction mixture to dissolve the metal salt formed or at least to dissolve enough of it that the precipitated portion does not form a slurry too thick to permit adequate stirring. Concentrated hydrochloric acid (36% HCl) contains sufficient water (3.6 moles per mole of HCl, which provides 18 moles of water per mole of nitrosamine in the reaction shown above) that no additional water is required even when anhydrous nitrosamine is used. When sulfuric acid is used, it is necessary to provide with the acid or from other source at least about 8 moles of water per mole of nitrosamine charged to the system. Sulfuric acid of 65% concentration will provide the minimum quantity of water required when no water is provided from other sources. Sulfuric acid of 43% concentration will provide as much water per mole of nitrosamine as 36% hydrochloric acid.

Both zinc sulfate and zinc chloride are appreciably more soluble than zinc acetate. It is therefore possible to carry out the process with a smaller quantity of water present when using sulfuric or hydrochloric acid than when using acetic acid.

Better yields of product are obtained when the amount of water present is somewhat greater than the minimum amount required to permit stirring of the reaction mixture. Excellent yields are obtained with about 20 moles of water per mole of nitrosamine charged, and in general this is approximately the optimum ratio of water to nitrosamine.

The use of more than about 30 moles of water per mole of nitrosamine does not result in any increase in yield or other advantage, and should be avoided, since it reduces the productive capacity of the equipment and increases the difficulty of recovering the product in pure form.

The reaction may be carried out at temperatures ranging from room temperature to reflux temperatures. Reflux temperatures are preferred, since they result in maximum reaction rate and permit easy removal of the heat of reaction by condensing and returning the vapors.

The process is carried out by placing the nitrosamine, usually in the form of a 20% to 60% aqueous solution of crude material, and powdered zinc in a reactor and then adding the acid over a period of time. It may be necessary to warm the mixture initially to start the reaction, after which the heat of reaction is sufficient to raise the temperature to the boiling point. The reaction rate is determined principally by the rate of addition of acid, and this is limited by the rate at which the heat of reaction can be removed by cooling coils or reflux condenser. Care is taken that the pH in the reactor does not fall below 2 at any time. It normally remains above 4 until most of the zinc has been consumed. Addition of acid is continued until the pH is below 4, but not below 2. A lower pH is avoided because nitrosamines are converted to amines in highly acid solution, and also because a lower pH would require not only an unnecessarily large amount of acid, but also additional alkali for neutralization prior to recovery of the product.

*Example 1.*—Duplicate experiments were run in which 2.2 moles of zinc was added to 1.0 mole of nitrosodimethylamine in the form of a 33.0% aqueous solution. To this mixture, 5.0 equivalents (2.5 moles) of sulfuric acid was added over a period of time with constant stirring at reflux temperature. The total quantity of water present was 8.3 moles. The pH of the final reaction mixture was 2.5. The reaction product was a thick paste, due to the presence of precipitated zinc sulfate. Analysis of the product indicated yields in the two runs of 58.7% and 63.0%, respectively, of theoretical.

*Example 2.*—Duplicate experiments were run, using the procedure of Example 1, but with 5.0 moles of HCl in the form of 36.0% hydrochloric acid substituted for the sulfuric acid. The water in the acid increased the total water present to 21.8 moles. The pH of the final reaction mixture was 3.0. No precipitated zinc salt was present. The yields in the two runs were 93.3% and 93.7%, respectively.

*Example 3.*—In this and the next example, the nitrosamine was prepared from amine, sodium nitrite and sulfuric acid and was used in the reduction step without separation or purification.

Cold water (358 gal.) was added to a reactor, followed by concentrated sulfuric acid (477 lb.). Next, anhydrous dimethylamine (400 lb.) was added, keeping the temperature between 15 and 50° C. The pH was adjusted to 3 by adding more acid or amine as required and the mixture was heated to 70° C. Sodium nitrite solution (675 lb. in 100 gal. of hot water) was added while maintaining the temperature at 70° C. and the pH at 2–4. The pH was maintained at 2–4 by addition of increments of sulfuric acid. Zinc powder (1340 lb.) was charged to the reactor, and sulfuric acid (2627 lb.) was added, keeping the temperature at a gentle reflux. The final pH was approximately 3. Sodium hydroxide (2000 lb., as recycle material first, and then as 50% caustic) was added to a separate unit into which the crude reaction product was then pumped. The mixture was distilled until the bulk of the product had been removed. A 70% yield, based on dimethylamine, was obtained.

In this example, the mole ratio of total water to the intermediate dimethylnitrosamine (assuming completed conversion of the amine to the nitrosamine) was 25 to 1. For the reduction step, 2.3 moles of zinc and 2.9 moles of sulfuric acid were used per mole of nitrosamine.

*Example 4.*—Cold water (332 gal.), 40% dimethylamine solution (900 lb.) and 40% sodium nitrite solution (1415 lb.) were simultaneously added to a reactor. Concentrated sulfuric acid (460 lb.) was then added, maintaining the mixture at 70° C. Zinc powder (1200 lb.) was charged to the reactor, followed by the addition of 2360 lb. of sulfuric acid, keeping the reaction mixture at gentle reflux. The final pH was approximately 3. The product was isolated as in Example 3 and a 93% yield of unsymmetrical dimethylhydrazine, based on dimethylamine, was obtained.

In this example, the mole ratio of total water to the intermediate nitrosamine was 30 to 1. For the reduction step, 2.3 moles of zinc and 2.9 moles of sulfuric acid were used per mole of nitrosamine.

*Example 5.*—A number of nitroso compounds were reduced with zinc and sulfuric acid, using the general procedure outlined in Example 1. The following table indicates the compounds used, the quantities of reagents used, the final pH, and the yield relative to the theoretical yield:

TABLE I.—ZINC-SULFURIC ACID REDUCTION OF DIALKYLNITROSAMINES

| N-nitroso Compound | $R^2NNO$, moles | Zn, moles | $H^2SO^4$, moles | Final pH | Yield $R^2NNH^2$, percent | |
|---|---|---|---|---|---|---|
| | | | | | Crude [1] | Recovered [2] |
| Di-n-propyl | 25.6 | 55.0 | 61.0 | 3–4 | | 62.0 |
| Di-iso-butyl | 2.7 | 5.1 | 6.0 | Acid | 44.0 | 21.3 |
| Di-n-butyl | 3.2 | 9.7 | 11.7 | 2.0 | 86.0 | 40.2 |
| Di-n-amyl | 3.8 | 8.2 | 8.6 | 3.5 | | 28.6 |
| Di-2-ethylhexyl | 4.0 | 8.7 | 12.0 | 3.0 | 47.0 | 17.7 |
| Morpholine | 1.0 | 2.2 | 2.2 | 3.5 | 32.0 | |
| Pyrrolidine | 3.9 | 7.8 | 7.8 | 3.0 | 21.0 | |
| Diallyl | 7.17 | 163.0 | 19.0 | 2.3 | 72.0 | 58.0 |

[1] Yield based upon weight and chemical analysis of the crude product.
[2] Pure hydrazine obtained by fractional distillation.

*Example 6.*—In a procedure similar to that used in Example 3, nitrosopiperidine was prepared by reacting 1.0 mole of the amine with 0.5 mole of sulfuric acid and 1.08 moles of sodium nitrite. The crude product was then reduced, using 2.2 moles of zinc and 2.8 moles of sulfuric acid. Analysis of the product indicated that 52% of the piperidine had been converted to N-aminopiperidine.

We claim:

1. A process for converting the N-nitroso derivative of a secondary amine selected from the group consisting of di-lower alkyl amines, piperidine, morpholine, and pyrrolidine to the N,N-disubstituted hydrazine corresponding to the precursor N-nitroso derivative which consists essentially of forming an aqueous mixture of the nitroso compound and zinc and adding an acid selected from the group consisting of sulfuric and hydrochloric until the pH of the reaction mixture is in the range of 2 to 4, the total amount of water in the final reaction mixture corresponding to 8 to 30 moles per mole of nitroso compound charged to the system, and isolating the hydrazine from the reaction mixture.

2. A process according to claim 1 in which the nitroso derivative is contained in the crude reaction product obtained by treating the corresponding amine with sodium nitrite and an acid selected from the group consisting of sulfuric and hydrochloric.

3. A process according to claim 1 in which the amount of water present in the final reaction mixture is about 20 moles per mole of original nitroso derivative.

4. A process according to claim 1 in which the N-nitroso derivative is nitrosodimethylamine.

5. A process according to claim 1 in which the acid is sulfuric acid.

6. A process according to claim 1 in which the acid is hydrochloric acid.

References Cited by the Examiner

UNITED STATES PATENTS 2,768,878  10/1956  Passino _____ 260—583
2,802,031   8/1957  Horvitz _____ 260—583

OTHER REFERENCES

Parkes, "Mellor's Modern Inorganic Chemistry," p. 672 (1951 ed.).

CHARLES B. PARKER, *Primary Examiner.*

LEON ZITVER, *Examiner.*

MUZIO B. ROBERTO, B. E. LEVIN,
*Assistant Examiners.*